O. W. Minard,
Spinning Brass Kettles.
No. 858. Reissued Nov 29, 1859.
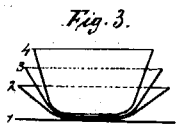
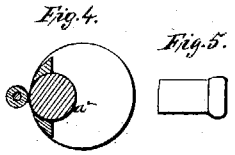
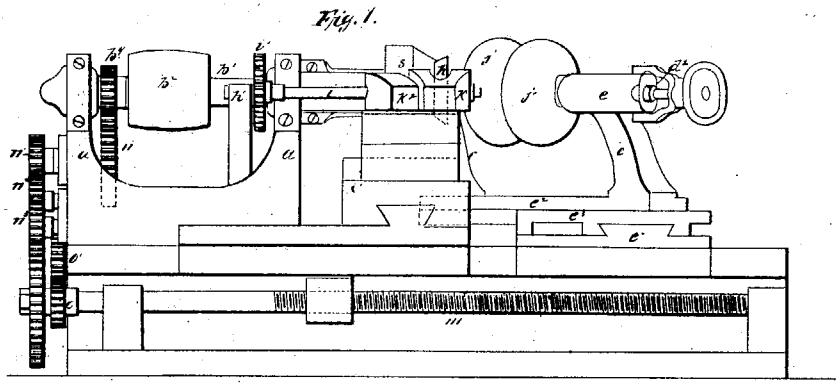
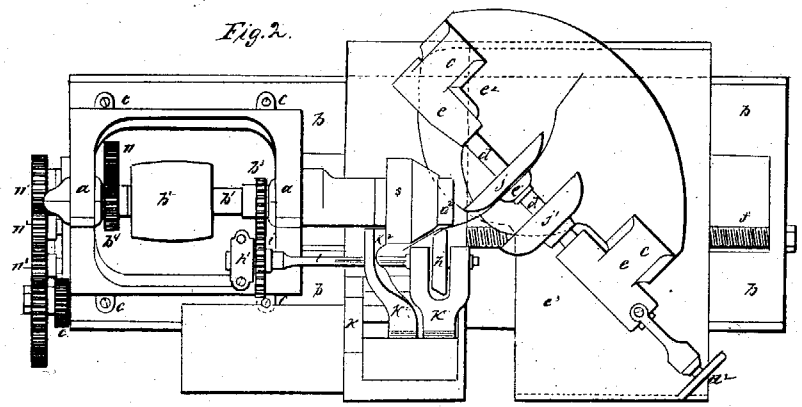
Witnesses:
W. H. Bishop
Chas. W. Lacy.
Inventor:
O. W. Minard

UNITED STATES PATENT OFFICE.

O. W. MINARD, OF WATERBURY, CONNECTICUT.

IMPROVEMENT IN MAKING BRASS KETTLES.

Specification forming part of Letters Patent No. 14,696, dated April 15, 1856; Reissue No. 858, dated November 29, 1859.

*To all whom it may concern:*

Be it known that I, O. W. MINARD, of Waterbury, in the county of New Haven and State of Connecticut, have invented certain new and useful Improvements in Machinery for Manufacturing Brass Kettles and like Articles; and I do hereby declare that the following is a full, clear, and exact description thereof, reference being had to the accompanying drawings, making part of this specification, in which—

Figure 1 is a side elevation; Fig. 2, a plan; Fig. 3, a section representing the progress of formation from a flat plate of brass to the perfectly-formed kettle. Fig. 4 is a cross-section of a pair of working-rollers, with a stationary substitute for what is termed the "sleeve;" and Fig. 5 is a separate view of the working-roller.

The same letters indicate like parts in all the figures.

The mode of operation of my said improved method of forming kettles from a flat disk of brass or other analogous metal or alloy is to roll the disk of metal between the peripheries of two rollers driven by suitable power, so that their peripheries shall travel, and thereby cause the disk of metal which is pinched between them to be drawn as in the usual method of drawing metals, but in the direction of a volute generated by the rotation of the disk of metal on its axis and a motion of its axis from the rollers, or what is the equivalent thereof, by a motion of the rollers from the axis of the disk, the axis of the disk during the operation being set at such an angle with the axis of the rollers as to cause the parts of the disk so rolled to assume a concavo-convex form, or to increase the concavity thereof, if acting on a concavo-convex disk.

Prior to my invention brass and other ductile metals and alloys had been formed from disks into various shapes by a mode of operation termed "spinning" or "burnishing," to form in which the disk of metal so to be formed is secured to a mold or former on the mandrel of a lathe, so as to be turned thereby and therewith, the said mold or former being of the configuration desired to be imparted to the disk of metal, and then, by the application of a smooth rounded tool or a roller to the opposite surface of the disk, forcing the metal of the disk into contact with the surface of the mold or former, thereby causing it to assume the form of the mold or former; but this process of spinning is objectionable, for the reason that in practice to give the forms usually required a series of molds or formers must be employed in succession for each article, all varying in form, and each in succession approaching more nearly to the last or ultimate form, and as the metal operated upon is not, at the time of the operation, in contact with the surface of the former, and is only brought in contact when the operation is completed on each successive part of the metal, it results that the metal is seriously strained by such operation. All these difficulties are avoided by the mode of operation which I have invented, as the metal operated upon is gripped between and supported by the two operating surfaces during the entire operation, just as in the operation of drawing the metals between the usual drawing-rollers, and the disk is made to assume the required form, not by being forced by pressure on one side toward and until it reaches the surface of the mold, but by reason of the angle formed by the axis of the disk with the axes of the rollers, and the line of motion by which these are caused to separate during the operation; and my said invention also consists in combining with the drawing-rollers a supporting rest to sustain the disk of metal that is being rolled, and beyond the point of action of the two rolling-surfaces to prevent the metal from crimping before the rolling-surfaces act upon it.

In the accompanying drawings, *a a* represent two heads, in which is mounted a rotating mandrel, $b'$. These heads form part of a metal stock, which is secured by four screw-bolts, *c c c c*, to the upper surface of two ways, *b b*, similar to the ways of a slide-lathe. The mandrel is provided with a pulley, $b^2$, to receive a belt from some suitable motor, by which it is to be driven; and the forward end carries a roller, $a^2$, the edge slightly rounded, and this forms one of the working-rollers. On this roller is fitted what I term a "supporting-rest," *s*, in the form of a sleeve, adapted to slide thereon freely but accurately, the forward end of the said rest being of a conical shape to rest against the inner face of the disk of metal and support it beyond the part on which the rollers are operating. In front of the mandrel there is a shaft, $i$, one journal of which is fitted to turn in a box, $h'$, connected with the stock of the heads $a$ $a$ in any suitable manner to admit of its swiveling slightly, so that the working-roller $h$ on the other end may be moved toward and from the working-roller $a^2$ on the mandrel to suit different thicknesses of metal and for taking off the kettle. The hub of the working-roller $h$ is mounted by suitable journals in a slide-rest, $k$, and it is hollow to slide on the shaft $i$, to which it is feathered, so as to be rotated by the shaft. The mandrel $b'$ and shaft $i$ are geared by two cog-wheels, $b^3$ and $i'$, of such diameter relatively to the diameter of the two working-rollers $a^2$ and $h$ as to cause the surface of the two rollers to travel toward each other. The rest $k$ is mounted on a sliding carriage, $k'$, by a slide in the usual manner of an adjustable rest, and should be provided with an adjusting-screw in the manner of a lathe-rest, so as to adjust the distance between the two working-rollers; and the carriage or base $k'$ of this slide-rest is fitted to slide longitudinally on the ways $b$ $b$ in the manner of a slide-lathe, and it is moved with a slow motion by means of a feed-screw, $m$, which screw receives motion from the mandrel by a train of wheels, $b^4$ $n$ $n'$ $n^2$ $n^3$, in the same manner as in a slide-lathe. In this manner, as the two working-rollers rotate, the roller $h$ travels with a slow motion from the end of roller, $a^2$, toward the mandrel, and at the same time the supporting-rest $s$ is permitted to slide back on the working-roller $a^2$ with a motion corresponding with the travel of the other working-roller, $h$, by reason of the motion of an arm, $k^2$, which extends back of this sustaining-rest, and which, being attached to the slide-rest $k$, moves in union with the roller $h$. The disk of metal to be rolled is clamped centrally between two clamping-plates, $j$ and $e'$, the plate $j$ being on one end of a spindle, $d$, which is fitted to turn freely but accurately in a head, $e$, and the other clamping-plate, $e'$, is on one end of another spindle, $d'$, adapted to turn in another and corresponding head, $e$, the two spindles being in line, the inner end of each spindle being pivoted with the view to have them turn freely, the pivot of the spindle $d'$ being fitted to turn in the end of a clamping-screw, $d^2$, provided with a hand-wheel by which to operate the clamping-plate $e'$. The clamping-plate $j$ is made slightly smaller than the bottom of the intended kettle or other vessel to be made and of the curvature intended to be given to the inside of the bottom, and the other clamping-plate, $e'$, is much smaller, and so small as to be just sufficient to hold the disk of metal. A third clamping-plate, $j'$, with one face concave, the reverse of and to fit the convex face of the plate $j$, is adapted to slide on the spindle $d'$ of the small clamping-plate $e'$, and as the metal disk is being rolled outside of the diameter of the two large clamping-plates $j$ $j'$ the one $j'$ is forced up against it to gradually give the required form to the bottom of the kettle or other vessel, the motion of the clamps with the disks from the rollers, as will be presently described, having the effect to aid in this species of swaging action produced by clamping between the two large plates. The forcing up of the large plate $j'$ may be by a nut tapped on the spindle $d'$, or other suitable mechanical means. The base-plate $e^2$ of the puppets $c$ $c$, which carry the spindles $d$ $d'$, is swiveled on the top of a carriage, $e^3$, so that the axis of the spindles of the clamp-plates can be turned and set at any angle desired with the axis of the working-roller $a^2$, and this is done by the same means as in the turning-rest of a slide-lathe. The carriage $e^3$ is fitted to slide on ways on the top of another carriage, $e^4$, which slides on the ways $b$ $b$. The lines of motion of the two carriages $e^3$ and $e^4$ are at right angles with each other, so that the center of the disk of metal to be rolled can be set in any desired position. The lower carriage, $e^4$, is connected in the manner of the slide-rest of a lathe with a screw-shaft, $m$, which receives motion from the mandrel $d$ by the same train of wheels as the screw $m$ with the addition of the two wheels $o$ $o'$. The machine being constructed thus, or in any equivalent manner, a disk of metal is clamped between the two plates $j$ and $e'$, and the carriages $e^3$ $e^4$ set in the required position relatively to the two working-rollers gripping that portion of the plate which is outside of the diameter of the gripping-plates. At the time of starting the machine the roller $h$ is set opposite the rounded end of the roller $a^2$, and, the machine being started, the rotation of the two rollers $a^2$ and $h$ causes the disk to rotate on its axis and to be rolled between them, and as that progresses the roller $h$ travels by a slow motion along the roller $a^2$, the action gradually moving toward the periphery of the disk and changing it from the flat form 1 in Fig. 3 to the form 2; and after that is completed the roller $h$ is moved back to the outer end of roller $a^2$, the angle of the spindles $d$ $d'$ to the axis of the roller $a^2$ increased, and the operation repeated, which brings the disk to the form 3, Fig. 3, and so on until the final form 4 is obtained, the clamp-plate $j'$ being gradually forced up to give the required form to the bottom. During the above motions the clamps, with the disk of metal between them, are moved from the drawing-rollers by the action of the screw $f$ on the carriage $e^4$. As the rolling operation progresses, the supporting-rest $s$ bears against the inner face of the disk of metal back of the line of action of the rollers, and as the roller $h$ travels along the roller $a^2$ this rest is forced back to retain the same relation.

Instead of giving the traversing motion partly to the roller $h$ and partly to the disk, the whole traversing motion may be given to the roller $h$ or to the disk; but I prefer the mode specifically described; and if it be desired to make kettles with curved sides, then the said carriages and the clamps which they carry must travel in a curvilinear direction, which motion may be imparted by any of the means employed in slide-lathes to carry the tool in a curved path; and when so changed the roller $a^2$ should be changed to the form represented in Fig. 5, the rolling being effected on the enlarged part of the roller; and although I prefer to make the supporting-rest a complete circle, fitted to turn with the roller $a^2$ and slide thereon freely, it may be made stationary—that is, not to turn with the roller $a^2$—as represented in Fig. 4.

What I claim as my invention, and desire to secure by Letters Patent in forming kettles and other analogous vessels of brass or other ductile metal or alloys, is—

1. The employment of two rotating rollers for gripping, turning, and rolling the disk of metal, substantially as described, in combination with the clamps or holders for holding the disk of metal at any desired angle with the axis of the rollers, substantially as described, and for the purpose specified.

2. The concave and convex clamping-plates, substantially as described, in combination with the rollers or any equivalent mode of rolling the metal, substantially as described.

3. In combination with the rollers for rolling the disk of metal, the supporting-rest for supporting the metal beyond the point of action of the gripping-rollers, substantially as set forth.

O. W. MINARD.

Witnesses:

ANDREW DE LACY,
WM. H. BISHOP.